United States Patent [19]

Tojima et al.

[11] Patent Number: 4,967,892
[45] Date of Patent: Nov. 6, 1990

[54] CUSHIONED CLUTCH DISC WITH STIFFENING PLATES

[75] Inventors: Hiromi Tojima; Hiroshi Mizukami, both of Osaka, Japan

[73] Assignee: Kabushiki Kaisha Daikin Seisakusho, Osaka, Japan

[21] Appl. No.: 427,389

[22] Filed: Oct. 27, 1989

[30] Foreign Application Priority Data

Nov. 17, 1988 [JP] Japan .................. 63-150296[U]
Nov. 24, 1988 [JP] Japan .................. 63-153020[U]

[51] Int. Cl.$^5$ ............................................. F16D 13/58
[52] U.S. Cl. ........................ 192/107 C; 192/107 R; 192/113 A
[58] Field of Search .......... 192/107 R, 107 M, 107 C, 192/113 A

[56] References Cited

U.S. PATENT DOCUMENTS

| 860,590 | 7/1907 | Williams | 192/107 R |
| 1,727,841 | 9/1929 | Raviolo | 192/107 C |
| 3,964,586 | 6/1976 | Barrett et al. | 192/107 C |
| 4,714,148 | 12/1987 | Alas et al. | 192/107 C |

Primary Examiner—Richard Lorence
Assistant Examiner—Nicholas Whitelaw
Attorney, Agent, or Firm—Armstrong, Nikaido, Marmelstein, Kubovcik & Murray

[57] ABSTRACT

A clutch disc including a disc-like annular facing members arrange to front on each other and a cushioning plate corrugated in circumferential direction. Stiffening plates which are disc-like annular bodies having inside and outside diameters approximately identical with those of facing members and on which slotted holes extending nearly in radial direction are made at plural places in circumferential direction, are glued to fronting surfaces of the facing members. The cushioning plate is disposed between the fronting stiffening plates to make convex portions on its both surfaces contact with portions located between the slotted holes of the stiffening plates, and is fastened by rivets to the contacting portions.

5 Claims, 4 Drawing Sheets

CUSHIONED CLUTCH DISC WITH STIFFENING PLATES

BACKGROUND ART

1. Industrial useful field

This invention relates to a clutch disc in which a rotational rupture strength (burst strength) of a facing members is improved.

2. Prior art and its problem

In order to prevent a facing member from being ruptured due to a strong centrifugal force caused by a high engine speed, it has been desired to improve a rotational rupture strength of the facing member. Therefore, a stiffening plate 2 consisting of an annular disc-like aluminum plate having plate thickness of 1.0 mm has conventionally been glued to a backside of an annular facing member 1 as illustrated in FIG. 8, so as to stiffen the facing member 1 to improve the rotational rupture strength of the facing member 1

However, the structure of FIG. 8 has required much labor due to a comparatively large thickness of the stiffening plate 2 and increased manufacturing cost due to expensive aluminum material. Further, an inertial force acting on the facing member 1 has been increased by the weighty stiffening plate 2, so that the rotational rupture strength of the facing member 1 has not been improved satisfactorily or feeling of change shifting would have been worsened.

SUMMARY OF THE INVENTION

In order to solve the above-mentioned trouble, stiffening plates which are disc-like annular bodies having inside and outside diameters approximately identical with those of facing members and on which slotted holes extending nearly in radial direction are made at plural places in circumferential direction, are glued to fronting surfaces of the disc-like annular facing members arranged to front each other; a cushioning plate corrugated in circumferential direction is interposed between the fronting stiffening plates to make convex portions of both faces contact with portions between the slotted holes of the stiffening plates; and the cushioning plate is fastened by rivets to the stiffening plates and the facing members at the foregoing contacting portions.

According to the present invention, the facing members are stiffened by the stiffening plates so that the rotational rupture strength becomes large. Further, the stiffening plate becomes light in its weight owing to the slotted holes formed thereon so that an increase in inertial force acting on the facing member can be controlled.

DETAILED DESCRIPTION OF THE INVENTION

Figure 1:
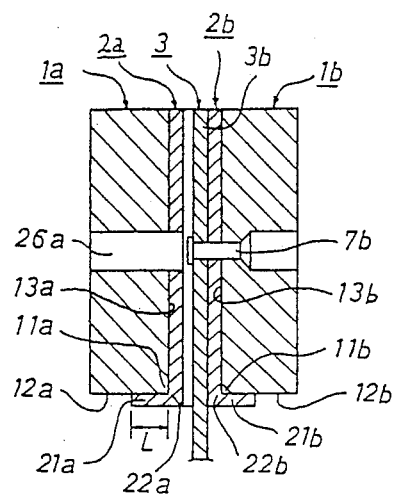
FIG. 1 is a vertical sectional view showing a facing of an embodiment.
Figure 2:
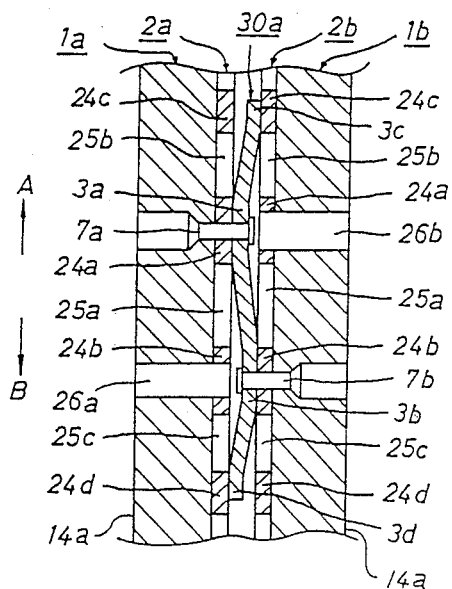
FIG. 2 is a lateral sectional partial view showing the facing part of the embodiment of FIG. 1.
Figure 4:
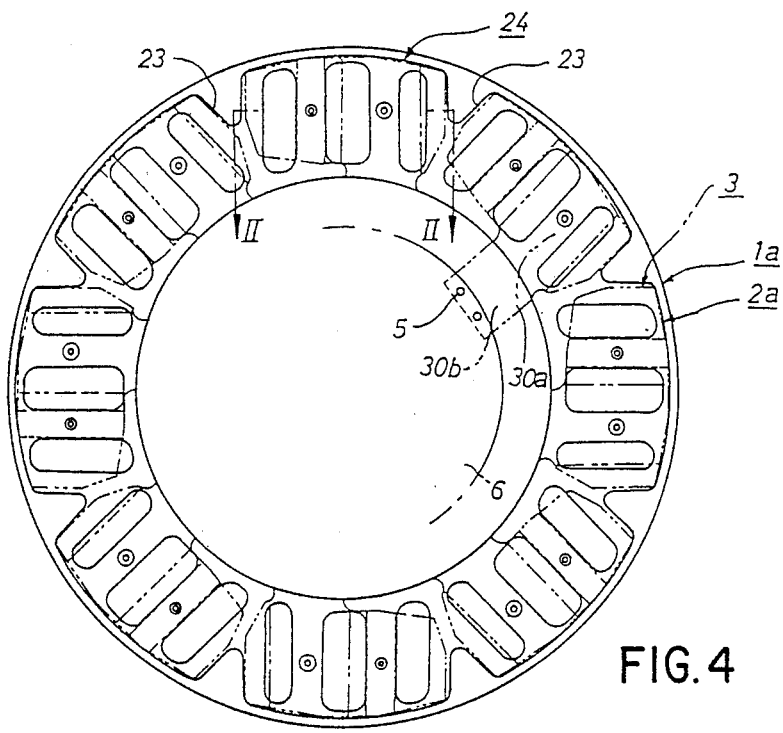
FIG. 4 is a view showing a state where the stiffening plate and a cushioning plate are secured to one side of a facing member.

FIG. 1 is the vertical sectional view showing the facing part of clutch disc, and FIG. 2 is the lateral sectional partial view showing the facing part similarly and is a view corresponding to a sectional view taken along a line II—II of FIG. 4 showing a state where the stiffening plate and the cushioning plate are secured to the one side facing member. In FIG. 1, 1a and 1b are identical disc-like annular facing members which are arranged so as to front on each other. 2a and 2b are disc-like annular stiffening plates made of 0.3 mm thick steel plate and having inside and outside diameters approximately similar to those of the facing members 1a and 1b, and their inner peripheral edges are bent perpendicularly by a length L which is smaller than a difference between a thickness of the facing members 1a and 1b and a thickness required for an allowance for wear (21a, 21b). Corners 22a and 22b of the above-mentioned bent portions 21a and 21b are made contact with inner peripheral corners 11a and 11b of the facing members 1a and 1b, and the stiffening plates 2a and 2b are thereby glued to inner peripheral surfaces 12a and 12b and fronting surfaces 13a and 13b by using adhesive agent consisting of thermosetting resin, for instance. A cushioning plate 3 is held between and secured to the fronting stiffening plates 2a and 2b.

Figure 3:
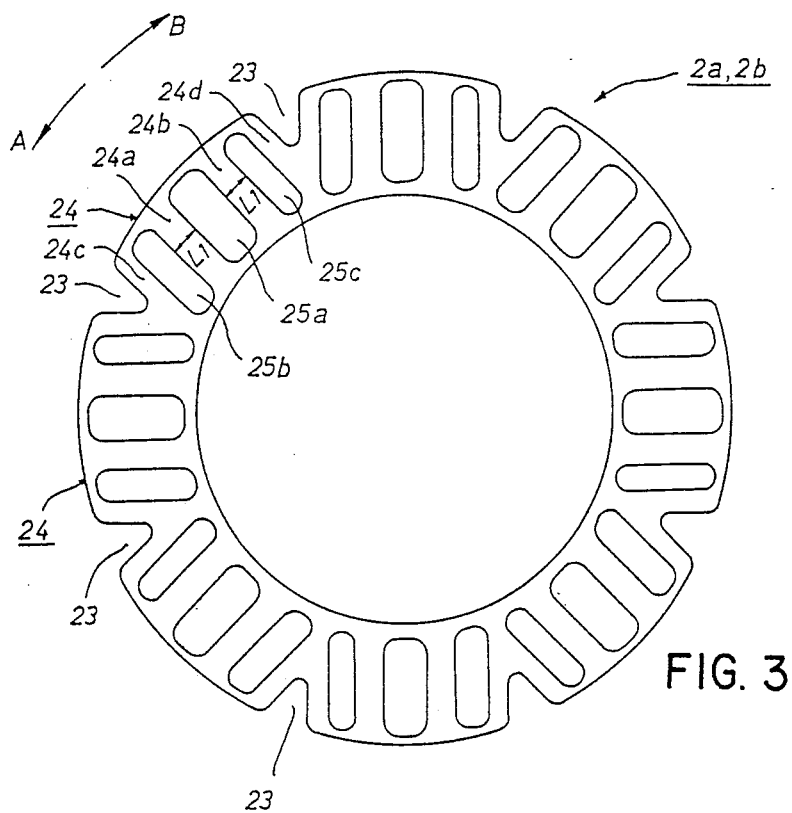
FIG. 3 is a view showing a stiffening plate as applied in the embodiment of FIG. 1.
Figure 8:
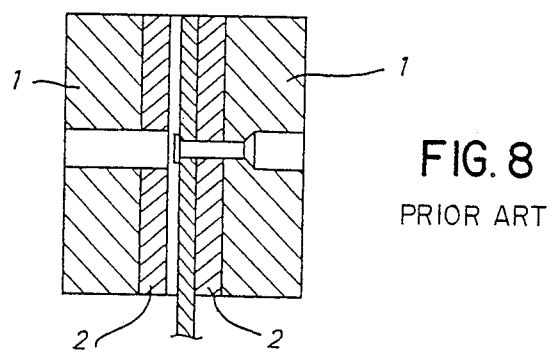
FIG. 8 is a vertical sectional partial view showing the facing part of a conventional clutch disc.

Slotted holes are punched out of the stiffening plates 2a and 2b as illustrated by FIG. 3. Namely, plural (eight in this figure) V-shaped notches 23 are made on their outer peripheries with equal spaces left therebetween. The notches 23 are formed by notching the outer peripheries up to positions slightly this side of radial central parts of them. On a portion (abbreviated to "piece portion" hereunder) 24 located between neighboring notches 23; there formed a slotted hole 25a extending in radial direction at its circumferential central position, a slotted hole 25b extending in parallel with and separated from the slotted hole 25a by a distance L1 toward a side of the slotted hole 25a as indicated by an arrow A of FIG. 3, and a slotted hole 25c extending in parallel with and separated from the slotted hole 25a by the distance L1 toward a side of the slotted hole 25a as indicated by an arrow B of FIG. 3. Incidentally, circumferential widths of the slotted holes 25a, 25b and 25c decrease a little in this order. The facings 1a and 1b to which the stiffening plates 2a and 2b are glued respectively are arranged in such a manner that piece portions 24 of the stiffening plates 2a and 2b front on each other.

The cushioning plates 3 are installed at plural places (eight places in this figure) with spaces left therebetween in circumferential direction as illustrated by FIG. 4. The plate 3 consists of an outer peripheral fastening portion 30a fastened to the piece portions 24 of the stiffening plates 2a and 2b and an inner peripheral fastening portion 30b fastened by rivets 5 to the clutch plate 6. Dimensions of the outer peripheral fastening portion 30a are approximately same as that of the piece portion 24. The fastening portion 30a of the plate 3 is corrugated in circumferential direction as illustrated by FIG. 2. The fastening portion 30a is so corrugated that convex portions on both surfaces contact with portions between the slotted holes of the stiffening plates 2a and 2b when the fastening portion 30a is interposed between the piece portions 24 on which the stiffening plates 2a and 2b front. Tip ends of the convex portions are made flat to enable the above-mentioned contact. Here, as illustrated by FIG. 2, the convex portion 3a of the fastening portion 30a contacts with a portion (abbreviated to "bridge portion" hereunder) 24a located between the slotted holes 25a and the slotted hole 25b of the stiffening plate 2a, the convex portion 3b contacts with a bridge portion 24b located between the slotted hole 25a and the slotted hole 25c of the stiffening plate 2b, the convex portion 3c forming circumferential end of the fastening portion 30a contacts with an edge portion 24c located at an arrow A side of the piece portion 24 of the stiffening plate 2b, and the convex portion 3d contacts with an edge portion 24d located at an arrow B side of the piece portion 24 of the stiffening plate 2a. The convex portion 3a is crimped by a rivet 7a to the stiffening plate 2a and the facing member 1a, and the convex portion 3b is crimped by a rivet 7b to the stiffening plate 2b and the facing member 1b, respectively. A through hole 26a for crimping the rivet 7b from backside is made on the facing member 1a and the bridge portion 24b of the stiffening plate 2a, and a through hole 26b for crimping the rivet 7a from backside is made on the facing member 1b and the bridge portion 24a of the stiffening plate 2b.

In the clutch disc having such the structure, the stiffening plates 2a and 2b are glued not only to the fronting surfaces 13a and 13b of the facing members 1a and 1b but to the inner peripheral surfaces 12a and 12b which form starting points of rupture, so that the rotational rupture strengths of the facing members 1a and 1b become considerably large. Further, since the slotted holes 25a, 25b and 25c and the notches 23 are made on the stiffening plates 2a and 2b at plural places, the stiffening plates 2a and 2b are made lighter in weight and inertial force acting on the facing members 1a and 1b is scarcely increased. Moreover, since the fastening portion 30a of the plate 3 is separated from the stiffening plates 2a and 2b at their portions fronting on the slotted holes 25a, 25b and 25c of the stiffening plates 2a and 2b, there is no chance for the fastening portion 30a to contact with the facing members 1a and 1b exposed in the slotted holes 25a, 25b and 25c during working of the clutch disc.

As described above, the following effects become obtainable according to the embodiment:

(1) The stiffening plates 2a and 2b, which are made lighter in weight by making the slotted holes 25a 25b and 25c and the notches 23 thereon, are glued not only to fronting surfaces 13a and 13b of the facing members 1a and 1b but to the inner peripheral surfaces 12a and 12b which form the starting points of rupture, so that the increase in inertia force acting on the facing members 1a and 1b can be controlled and the rotational rupture strengths of the facing members 1a and 1b can be increased by a large margin. In addition, the slotted holes 25a, 25b and 25c are made on the stiffening plates 2a and 2b in such a manner as to extend in approximately radial direction and the V-shaped notches 23 are made by notching the outer periphery up to the position slightly outer than the radial central part, so that the plates are made lighter in weight effectively by leaving only portions crimped by the rivets 7a and 7b, to the minimum, for convex portions of the fastening portions 30a of the plate 3 without weakening the stiffening plates 2a and 2b.

(2) Since the increase in inertia force acting on the facing members 1a and 1b can be controlled, the worsening of feeling of change shift can be avoided.

(3) The fastening portion 30a of the plate 3 is separated from the stiffening plates 2a and 2b at the portions fronting on the slotted holes 25a, 25b and 25c of the stiffening plates 2a and 2b, so that it becomes possible to prevent the facing members 1a and 1b exposed in the slotted holes 25a, 25b and 25c from being damaged by the fastening portion 30a and service life of the facing members 1a and 1b can be prolonged.

(4) Since the stiffening plates 2a and 2b made of steel are put in use, manufacturing cost can be reduced as compared with the conventional ones made of aluminum. Further, manufacturing work becomes easy owing to the thin plate thickness.

Incidentally, the structure of this embodiment can be changed as follows:

The stiffening plates 2a and 2b may be made of resin. The stiffening plates 2a and 2b can thereby be made lighter in weight as compared with that made of steel, and the increase in inertia force acting on the facing members 1a and 1b can further be controlled.

Moreover, the gluing of the stiffening plates 2a and 2b to the facing members 1a and 1b may be carried out simultaneously with the molding of the facing members 1a and 1b. The manufacturing process will be simplified by doing so.

Furthermore, plural grooves (not shown) may be formed, which extend from the inner periphery to the outer periphery and incline slightly in a direction opposite to the rotating direction of clutch. The facing members 1a and 1b can be made lighter in weight by that amount, the increase in inertia force acting on the facing members 1a and 1b can further be controlled, and engagement of the clutch can be done smoothly.

Figure 6:
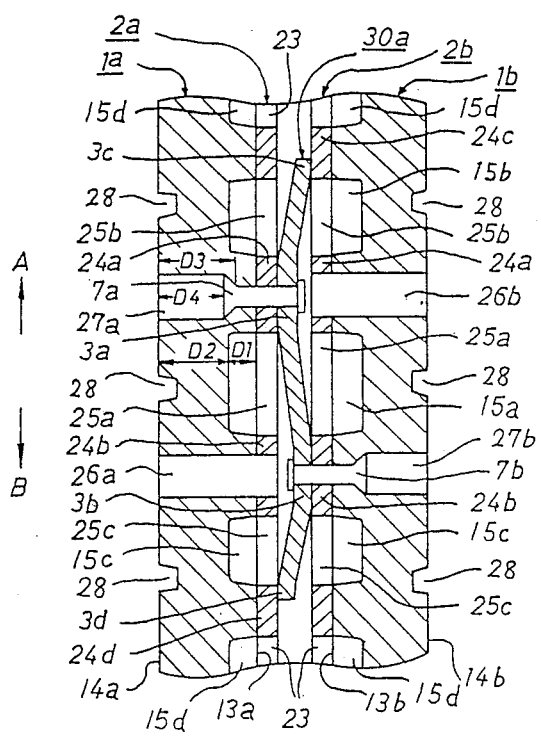
FIG. 6 is a sectional view taken along a line VI—VI of FIG. 5.
Figure 5:
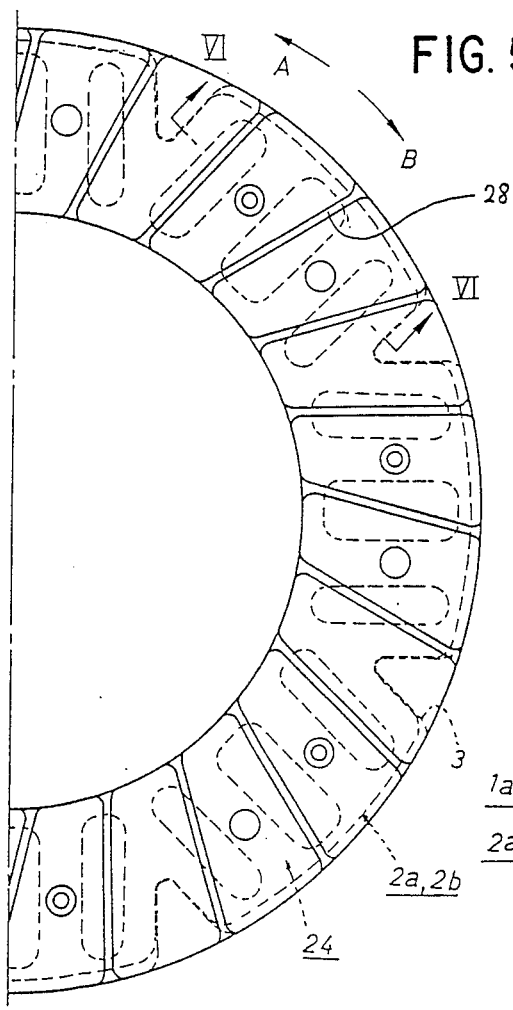
FIG. 5 is a partial view showing the facing part of another embodiment.
Figure 7:
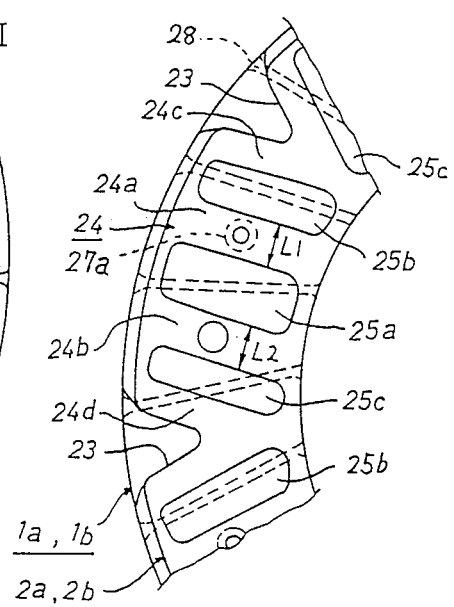
FIG. 7 is a partial view showing a state where the stiffening plate is glued to the facing member in the embodiment of FIG. 5.

FIG. 5 through FIG. 7 show another embodiment. FIG. 5 is the partial view showing the facing part of clutch disc and viewed from the flywheel side FIG. 6 is the sectional view taken along the line VI—VI of FIG. 6. In FIG. 6, components attached with the same symbols as FIG. 2 represent the same or similar components. The structure is partially identical with that of the embodiment of FIG. 1 in that the stiffening plates 2a and 2b are glued to the fronting surfaces 13a and 13b of the facing members 1a and 1b and the fastening portion 30a of the plate 3 is fastened by the rivets 7a and 7b to the bridge portions 24a and 24b of the stiffening plates 2a and 2b. Here, the stiffening plates 2a and 2b are made of aluminum sheet or steel sheet Naturally, the stiffening plates 2a and 2b may be made of iron or resin. FIG. 7 is the view viewed from the stiffening plate side, in which the stiffening plate 2a or 2b is glued to the facing member 1a or 1b. The slotted hole 25b is separated from the slotted hole 25a by a distance L1 and the slotted hole 25c is separated from the slotted hole 25a by a distance L2.

In this embodiment, concave portions 15a, 15b and 15c are formed on the fronting surfaces 13a and 13b of the facing members 1a and 1b at places corresponding to the slotted holes 25a, 25b and 25c of the stiffening plates 2a and 2b; and concave portions 15d are formed thereon at places corresponding to the notches 23, as illustrated by FIG. 6. The concave portions 15a, 15b, 15c and 15d are made by the molding process, and their depths D1 are determined to an extent that depths D2 from bottoms of the concave portions 15a, 15b, 15c and 15d to surfaces 14a and 14b of the facing members 1a and 1b become not less than thicknesses required for the allowance for wear. Incidentally, the depths D1 of the concave portions 15a, 15b, 15c and 15d may be different each other. The grooves 28 extending from the inner periphery to the outer periphery are made on the surfaces 14a and 14b of the facing members 1a and 1b at places corresponding to the slotted holes 25a, 25b and 25c. The grooves 28 slightly incline toward a side opposite to the rotating direction of clutch (as indicated by arrow B of figure), as illustrated in FIG. 5. A rivet hole 27a is made on the surface 14a at a radial central part corresponding to the bridge portion 24a of the stiffening plate 2a. A depth D3 is determined to an extent that a distance D4 from the surface 14a to the top of the rivet 7a becomes not less than a thickness required for the allowance for wear of the facing member 1a. A rivet hole 27b having a similar depth with the rivet hole 27a is made on the surface 14b at a radial central part corresponding to the bridge portion 24b located between the slotted hole 25a and the slotted hole 25c of the stiffening plate 2b.

In the clutch facing having such a construction, the stiffening plates 2a and 2b are glued to the fronting surfaces 13a and 13b of the facing members 1a and 1b, so that the rotational rupture strengths of the facing members 1a and 1b become large. Further, the stiffening plates 2a and 2b are made lighter in weight because the slotted holes 25a, 25b and 25c and the notches 23 are made thereon, and the facing members 1a and 1b are also made lighter in weight because the concave portions 15a, 15b, 15c and 15d and the grooves 28 are made thereon; so that the inertia force acting on the facing members 1a and 1b does not increase or will increase only a little, if so. The fastening portion 30a of the plate 3 is separated from the stiffening plates 2a and 2b at portions fronting on the concave portions 15a, 15b, 15c and 15d of the facing members 1a and 1b, and the bottoms of the concave portions 15a, 15b, 15c and 15d are separated from the fronting surfaces of the stiffening plate 2a or 2b by a distance of the depth D1 added to the thickness of the stiffening plates 2a or 2b; so that there is no chance for the fastening portion 30a to contact with the facing members 1a and 1b through the slotted holes 25a, 25b and 25c during working of the clutch disc.

As described above, the following effects are obtainable according to the present invention:

(1) Not only the stiffening plates 2a and 2b are glued to the fronting surfaces 13a and 13b of the facing members 1a and 1b to stiffen the facing members 1a and 1b, but also the slotted holes 25a, 25b, and 25c and the notches 23 are made on the stiffening plates 2a and 2b to make them lighter in weight, and further the concave portions 15a, 15b, 15c and 15d and the grooves 28 are made on the facing members 1a and 1b to make them lighter in weight too; so that the increase in inertia force acting on the facing members 1a and 1b can be avoided or can be controlled to a minimum so as to sufficiently enlarge the rotational rupture strengths of the facing members 1a and 1b. Moreover, the concave portions 15a, 15b and 15c are made on the facing members 1a and 1b at places corresponding to the slotted holes 25a, 25b and 25c, the concave portions 15d are made thereon at places corresponding to the notches 23, and the grooves 28 are made on the surfaces 14a and 14b at places corresponding to the concave portions 15a, 15b and 15c; so that the facing members 1a and 1b are made lighter in weight effectively in the same way as the stiffening plates 2a and 2b.

(2) Since the increase in inertia force acting on the facing members 1a and 1b can be controlled more intensely as compared with the embodiment of FIG. 1, the worsening of feeling in change shift can be avoided surely.

(3) During working of the clutch disc, the fastening portion 30a contacts with the bridge portions 24a and 24b and the edge portions 24c and 24d, but does not contact with the facing members 1a and 1b. Therefore, the facing members 1a and 1b can be prevented from being damaged by the fastening portion 30a, decrease in spring effect of the plate 3 due to intrusion of the fastening portion 30a in the facing members 1a and 1b can be avoided, and the clutch can be prevented from being deteriorated in its engaging characteristic.

(4) The grooves 28 are formed on the surfaces 14a and 14b of the facing members 1a and 1b, and the grooves 28 incline slightly toward the side opposite to the rotating direction of clutch (as indicated by the arrow B of FIG. 5); so that the clutch can be engage smoothly.

Also in this embodiment, the gluing of the stiffening plates 2a and 2b to the facing members 1a and 1b may be carried out by the molding process simultaneously with the molding of the facing members 1a and 1b.

What is claimed is:

1. A clutch disc, in which stiffening plates which are disc-like annular bodies having inside and outside diameters approximately identical with those of facing members and on which slotted holes extending nearly in the radial direction are made at plural places in the circumferential direction, are glued to fronting surfaces of the disc-like annular facing members arranged to front on each other; a cushioning plate corrugated in circumferential direction is interposed between the fronting stiffening plates to make convex portions of both faces contact with portions between the slotted holes of the stiffening plates; and the cushioning plate is fastened by rivets to the stiffening plates and the facing members at said portions.

2. A clutch disc, in which stiffening plates which are disc-like annular bodies having inside and outside diameters approximately identical with those of facing members and on which slotted holes extending nearly in the radial direction and notches are made at plural places in the circumferential direction, are glued to fronting surfaces of the disc-like annular facing members arranged to front each other; concave portions having prescribed depths, which leave more thicknesses than required for allowance for wear of the facing members, are formed on at least one of portions corresponding to said slotted holes of the fronting surfaces of the facing members; cushioning plate corrugated in circumferential direction is interposed between the fronting stiffening plates to make convex portions of both faces contact with portions between the slotted holes of the stiffening plates; and the cushioning plate is fastened by rivets to the stiffening plates and the facing members at said portions.

3. A clutch disc as set forth in claim 1 or claim 2, in which inner peripheral edges of the stiffening plates are bent perpendicularly by a length which is smaller than a difference between a thickness of the facing member and a thickness required for an allowance for wear, corners of said bent portions are made contact with inner peripheral corners of the facing members, and the bent portions are glued to inner peripheral surfaces of the facing members.

4. A clutch disc as set forth in claim 1 or claim 2, in which the stiffening plates are made of iron or resin.

5. A clutch disc as set forth in claim 1 or claim 2, in which plural grooves extending from inner periphery to outer periphery and inclining toward a side opposite to rotating direction of clutch are formed on surfaces of the facing members.

* * * * *